(12) United States Patent
Guo et al.

(10) Patent No.: US 12,000,954 B2
(45) Date of Patent: Jun. 4, 2024

(54) TRANSMIT BEAMFORMING METHOD FOR INTEGRATED MULTI-ANTENNA SYSTEM WITH JOINT NEAR-FIELD SENSING AND FAR-FIELD COMMUNICATION

(71) Applicant: SHANDONG UNIVERSITY, Jinan (CN)

(72) Inventors: Shuaishuai Guo, Jinan (CN); Kaiqian Qu, Jinan (CN); Jia Ye, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/451,148

(22) Filed: Aug. 17, 2023

(65) Prior Publication Data

US 2024/0134003 A1    Apr. 25, 2024

(30) Foreign Application Priority Data

Oct. 14, 2022    (CN) .......................... 202211259635.4

(51) Int. Cl.
*G01S 7/40*    (2006.01)
*H01Q 3/40*    (2006.01)

(52) U.S. Cl.
CPC ............. *G01S 7/4008* (2013.01); *H01Q 3/40* (2013.01)

(58) Field of Classification Search
CPC .. H04B 7/0617; H04B 7/0452; H04B 7/0413; H04L 25/0391; G01S 7/282;
(Continued)

(56) References Cited

U.S. PATENT DOCUMENTS

| 2018/0069608 A1* | 3/2018 | Nishimoto ............... H04B 7/04 |
| 2021/0028826 A1* | 1/2021 | Takahashi ............ G01S 7/2813 |
| 2022/0043111 A1 | 2/2022 | Dobrev et al. |

FOREIGN PATENT DOCUMENTS

| CN | 103744076 A | 4/2014 |
| CN | 113721198 A | 11/2021 |

(Continued)

OTHER PUBLICATIONS

L. Yan-ping, J. Yan-min and Z. Chao-zhu, "Robust near-field beamforming with worst case performance based on convex optimization," Proceedings of 2012 5th Global Symposium on Millimeter-Waves, Harbin, China, 2012, pp. 608-611, doi: 10.1109/GSMM.2012.6314412. (Year: 2012).*

(Continued)

*Primary Examiner* — Olumide Ajibade Akonai
(74) *Attorney, Agent, or Firm* — CBM PATENT CONSULTING, LLC

(57) ABSTRACT

A transmit beamforming method for integrated multi-antenna systems with joint near-field sensing and far-field communication, which includes: (1) establishing a communication signal transmission model and a communication channel model, and analyzing an upper limit of communication spectrum efficiency; (2) acquiring an optimal communication beam matrix based on the communication channel model; (3) establishing a near-field sensing signal model; (4) generating an optimal radar beam matrix based on an antenna array response vector of a radar detection target; (5) introducing a compromise factor to construct an initial optimization problem of an integrated beamforming matrix in power constraint based on the established near-field sensing signal model; and (6) transforming and solving the constructed initial optimization problem to obtain the integrated beamforming matrix.

7 Claims, 7 Drawing Sheets

(58) Field of Classification Search
CPC ...... G01S 7/2813; G01S 13/42; H04W 16/28; H04W 88/02; H04W 88/08; H04W 2013/0245
See application file for complete search history.

(56) References Cited

FOREIGN PATENT DOCUMENTS

| | | |
|---|---|---|
| CN | 114726410 A | 7/2022 |
| CN | 115085774 A | 9/2022 |
| WO | 2016202280 A1 | 12/2016 |

OTHER PUBLICATIONS

L. -W. Chen, J. -S. Zheng, M. -K. Su and S. Huang, "A Novel Beamforming Technique: Introducing a Convex Constrained Optimization and Compressed-Sensing Model," in IEEE Antennas and Propagation Magazine, vol. 58, No. 4, pp. 48-59, Aug. 2016, doi: 10.1109/MAP.2016.2569476. (Year: 2016).*

* cited by examiner

TRANSMIT BEAMFORMING METHOD FOR INTEGRATED MULTI-ANTENNA SYSTEM WITH JOINT NEAR-FIELD SENSING AND FAR-FIELD COMMUNICATION

CROSS-REFERENCE TO RELATED APPLICATIONS

This application claims priority to Chinese Patent Application Ser. No. CN2022112596354 filed on 14 Oct. 2022.

FIELD OF THE INVENTION

The present disclosure relates to a transmit beamforming method for integrated multi-antenna systems with joint near-field sensing and far-field communication, and relates to the technical field of wireless communication.

BACKGROUND OF THE INVENTION

With the arrival of the 5G era, the number of mobile communication devices is growing explosively, and there is a shortage of the original communication spectrum resources. A direction of the future research is to explore the coexistence of communication systems and other electronic devices in a high frequency band (such as millimeter wave), while trying to improve the spectrum utilization efficiency. Radar frequency band is widely considered as one of the best frequency bands to achieve this purpose. Therefore, the integration of communication and sensing (radar) has emerged [LIU Fan, YUAN Weijie, YUAN Jinhong, et al. Radar-communication spectrum sharing and integration: Overview and prospect[J]. Journal of Radars, 2021, 10(3): 467-484.]. A communication and sensing integration system shares a hardware platform and the spectrum resources. By designing an integrated signal processing scheme to achieve the two functions of communication and sensing, the hardware resources can be effectively saved, the overhead can be reduced, and the spectrum utilization can be improved. Thus, it has become the focus of attention in multiple fields. With a multi-antenna technology, receiving and emitting ends are equipped with a plurality of antennas, which increases waveform freedom and effectively improves the performance of communication and sensing.

Liu F et al. proposed a beamforming design for a dual-functional radar communication system at a millimeter wave band [Liu F, Masouros C. Hybrid beamforming with sub-arrayed MIMO radar: Enabling joint sensing and communication at mmWave band[C]//ICASSP 2019-2019 IEEE International Conference on Acoustics, Speech and Signal Processing (ICASSP). IEEE, 2019: 7770-7774.], providing a good performance trade-off between sensing and communication with a far-field model. However, an operating frequency band is high, and an antenna size directly proportional to the wavelength is decreased. In view of these problems, a massive antenna array (massive MIMO) has become an effective way to increase communication distance in the high frequency band. As the antenna scale enlarges, array near-field coverage expands, and targets of interest to the radar are more likely to be distributed in the near field. Due to the unique electromagnetic wave characteristics in the near-field region, the original design has a performance loss in signal power when sensing targets in the near-field range.

SUMMARY OF THE INVENTION

In view of the deficiencies of the related art, the present disclosure provides a transmit beamforming method for integrated multi-antenna systems with joint near-field sensing and far-field communication. Specifically, considering the current situation of the increased antenna scale and array aperture, the present disclosure designs a beam for the case that a sensing target is located in the near field, and a communication target is located in the far field for an integrated sensing and communication system. A near-field signal model is established, an optimal beam matrix for near-field sensing is constructed, and an optimal beam matrix for communication is constructed using channel matrix decomposition. A compromise factor is introduced in power constraint, and an approximately optimal beam matrix is found by minimizing a sum of Euclidean distances between the beam matrix and the optimal beam matrix. The sensing performance of the beam design method of the present disclosure is superior to that of the original design in a case that the communication rate is constant.

The present invention adopts the following technical solutions.

A transmit beamforming method for integrated multi-antenna systems with joint near-field sensing and far-field communication includes the following steps:

(1) establishing a communication signal transmission model and a communication channel model, and analyzing an upper limit of communication spectrum efficiency;

(2) acquiring an optimal communication beam matrix $F_{com}$ based on the established communication channel model in step (1);

(3) establishing a near-field sensing signal model;

(4) generating an optimal radar beam matrix $F_{rad}$ based on an antenna array response vector of a radar detection target;

(5) introducing a compromise factor to construct an initial optimization problem of an integrated beamforming matrix in power constraint based on the established near-field sensing signal model; and (6) transforming and solving the constructed initial optimization problem of an integrated beamforming matrix in step (5) to obtain the integrated beamforming matrix.

Preferably, in the present disclosure, the transmit beamforming method of a multi-antenna integrated system is applied to a multi-input and multi-output communication and sense integration system. The system includes a base station equipped with $N_t$ antennas and a multi-antenna user equipment equipped with $N_r$ antennas. The antennas at the receiving and transmitting ends are uniform linear arrays with antenna array elements spaced half the wavelength. The number of transmit data streams is $N_s$, and the number of targets of interest to a radar is $N_{tar}$.

Preferably, in the present disclosure, the establishing a communication signal transmission model in step (1) means that when determining a symbol vector s transmitted by an emitting end, under the action of an transmit beamforming matrix F, the communication signal transmission model is represented by formula (I):

$$Y = \sqrt{\rho} W^H H F s + W^H n \qquad (I).$$

In the formula (I), Y represents a signal received by the receiving end; $\rho$ represents average receiving power of the receiving end; $W \in \mathbb{C}^{N_r \times N_s}$ represents a receiving beamforming matrix; $F \in \mathbb{C}^{N_t \times N_s}$ represents the transmit beamforming matrix; $s \in \mathbb{C}^{N_t \times N_s}$ represents the symbol vector; various data streams are mutually uncorrelated and satisfy $\mathbb{E}(ss^H) = I_{N_s}$; $H \in \mathbb{C}^{N_r \times N_t}$ represents a transmission channel matrix, namely, the communication channel model; n~ℕ(0, $N_0 I_{N_r}$) represents a Gaussian noise vector; and $N_0$ represents noise power.

Further preferably, for a wireless communication channel, a multi-path channel model, namely, a Saleh-Valenzuela model, is used. If the antenna spacing is half of the wavelength, the transmission channel matrix H is represented by formula (II):

$$H = \sqrt{\frac{N_t \times N_r}{L}} \sum_{i=1}^{L} \alpha_i a_r(\theta_i) a_t^H(\varphi_i). \quad \text{(II)}$$

In the formula (II), L represents the number of paths in the channel; $\alpha_i$ represents a fading coefficient of an $i^{th}$ path following Gaussian distribution; $N_t$ represents the number of antennas of an emitting end of a base station; $N_r$ represents the number of antennas received by a user end; $\theta_i$ and $\varphi_i$ represent an arrival angle and an transmit angle of an $i^{th}$ path of beam; and $a_r(\theta_i)$ and $a_t(\varphi_i)$ represent steering vectors of the receiving end and the emitting end of the $i^{th}$ path and are represented by formula (III) and formula (IV), respectively:

$$a_r(\theta_i)=[1, e^{-j\pi \sin(\theta_i)}, \ldots, e^{-j\pi(N-1)\sin(\theta_i)}] \quad \text{(III)}$$

$$a_t(\varphi_i)=[1, e^{-j\pi \sin(\varphi_i)}, \ldots, e^{-j\pi(N-1)\sin(\varphi_i)}] \quad \text{(IV)}.$$

Preferably, in the present disclosure, in step (1), the analyzing an upper limit of communication spectrum efficiency means that the upper limit of the communication spectrum efficiency R is represented by formula (V):

$$R=\log_2|I+R_n^{-1}W^H H F F^H H^H W| \quad \text{(V)}.$$

In the formula (X), $$R_n = \frac{1}{SNR} W^H W,$$

and SNR represents a signal-to-noise ratio.

Preferably, in the present disclosure, in step (2), the acquiring an optimal communication beam matrix $F_{com}$ based on the communication channel model in step (1) means that the optimal communication beam matrix $F_{com}$ is constructed based on a way of singular value decomposition of a channel matrix, and specifically means that $H=U\Sigma V^H$ represents singular value decomposition of a transmission channel matrix, and the optimal communication beam matrix $F_{com}$ is composed of right singular vectors of $N_s$ maximum singular values of a right singular matrix obtained after singular value decomposition of H, as shown in formula (VI):

$$F_{com}=V[:,1:N_s] \quad \text{(VI)};$$

a receiving beamforming matrix W is composed of left singular vectors of the $N_s$ maximum singular values of the right singular matrix obtained after singular value decomposition of H, as shown in formula (VII):

$$W=U[:,1:N_s] \quad \text{(VII)}.$$

Preferably, in the present disclosure, step (3) means that when the target is in an array near-field range $$r \leq \frac{2D^2}{\lambda},$$

an array steering vector at the target (r, θ) is established, as shown in formula (VII):

$$a(r, \theta) = \begin{bmatrix} 1 \\ \frac{r}{d_1}\exp(-jk(d_1 - r)) \\ \frac{r}{d_2}\exp(-jk(d_2 - r)) \\ \vdots \\ \frac{r}{d_{N_t-1}}\exp(-jk(d_{N_t-1} - r)) \end{bmatrix}, r \leq \frac{2D^2}{\lambda}. \quad \text{(VII)}$$

In the formula (VII), r represents the distance of the target; θ represents the angle at which the target is located; λ represents the wavelength; D represents an antenna array aperture; $d_i$ represents the distance of the target from an $i^{th}$ antenna $$i = 1, 2 \ldots N_t - 1; k = \frac{2\pi}{\lambda}$$

represents a wave number; and $j=\sqrt{-1}$ represents an imaginary symbol.

Further preferably, in step (3), the near-field sensing signal model is represented as a directional pattern of a near-field radar transmit signal P(θ, r), as shown in formula (IX):

$$P(\theta,r)=a(\theta,r)Ra^H(\theta,r) \quad \text{(IX)}.$$

In the formula (IX), R represents a covariance matrix of the transmit signal.

Preferably, in the present disclosure, in step (4), the generating an optimal radar beam matrix $F_{rad}$ based on an antenna array response vector of a radar detection target specifically includes:

1) making a design of a radar detection signal x equivalent to a design of an transmit beamforming matrix F, in which due to a covariance matrix of the transmit signal $R=E(xx^H)=E(Fs(Fs)^H)=FF^H$, formula (IX) is represented by formula (X):

$$P(\theta,r)=a_t^H(\theta,r)Ra_t(\theta,r)=\|F^H a_t(\theta,r)\|_F^2 \quad \text{(X)};$$

2) generating the optimal radar beam matrix $F_{rad}$ directly based on the antenna array response vector of the radar detection target, in which an transmit front end is a hybrid modulus fully-connected structure, and the optimal radar beam matrix $F_{rad}$ is constructed as formula (XI):

$$F_{rad}=[v_1 \ v_2 \ldots v_{tar}]\in \square^{N_t \times N_{tar}} \quad \text{(XI)}.$$

In the formula (XI), $v_i$ is an element in an array steering vector:

$$v_i = \frac{1}{\sqrt{N_t}} a(\theta_i, r_i) \ i = 1, 2 \ldots N_{tar}; N_{tar}$$

is the number of the detection targets; $a(\theta_i, r_i)$ represents a steering vector at which an $i^{th}$ detection target is located; and $\theta_i$ and $r_i$ represent the angle and the distance of the $i^{th}$ target.

Further preferably, a radar performance measurement index is defined as a Euclidean distance between the transmit beamforming matrix F and the optimal radar beam matrix $F_{rad}$: $\|F-F_{rad}\|_2^F$.

Preferably, in the present disclosure, in step (5), introducing a compromise factor to construct an initial optimization problem of an integrated beamforming matrix in power constraint based on the established near-field sensing signal model. It means that transmit power is taken as constraint, the target function is to minimize a sum of Euclidean distances between an transmit beamforming matrix F, the optimal radar beam matrix $F_{rad}$ and the optimal communication beam matrix $F_{com}$ with the compromise factor being introduced, and the optimization problem, namely, the initial optimization problem of an integrated beamforming matrix is established and represented by formula (XII):

$$\begin{cases} \min_F \eta \|F - F_{com}\|_F^2 + (1-\eta)\|F - F_{rad}\|_F^2 \\ \text{s.t.} \|F\|_F^2 = P_T \end{cases} \quad (XII)$$

In the formula (XII), $F_{com}$ represents the optimal beam matrix for communication; $F_{rad}$ represents the optimal beam matrix of a radar; $r_i$ represents the compromise factor within [0, 1]; and $P_T$ represents total transmit power.

Preferably, in the present disclosure, in step (6), the transforming and solving the constructed initial optimization problem of an integrated beamforming matrix in step (5) to obtain the integrated beamforming matrix specifically includes:

1) constructing auxiliary variables $A=[\sqrt{\eta}I_{N_t}^T, \sqrt{1-\eta}I_{N_t}^T]^T \in \mathbb{C}^{2N_t \times N_t}$ and $B=[\sqrt{\eta}F_{com}^T, \sqrt{1-\eta}F_{rad}^T]^T \in \square^{2N_t \times N_s}$, and converting formula (XI) into a quadratic constrained and quadratic programming problem in an equivalent form, as shown in formula (XIII):

$$\begin{cases} \min_F \|AF - B\|_F^2 \\ \text{s.t.} \|F\|_F^2 = P_T \end{cases} \quad (XIII)$$

2) introducing $E=I_{N_s} \otimes A$, $f=\text{vec}(F)$, $b=\text{vec}(B)$, $t=\pm 1$, in which vec ($\square$) represents an column vector stacking operation, $\otimes$ represents a Kronecker product, and the formula (XIII) is deformed to obtain formula (XIV):

$$\begin{cases} \min_f \|Ef - tb\|_2^2 \\ \text{s.t.} \|f\|_2^2 = P_T, t^2 = 1 \end{cases} \quad (XIV)$$

3) constructing $$C = \begin{bmatrix} E^H E & -E^H b \\ -b^H E & b^H b \end{bmatrix}, y = \begin{bmatrix} f \\ t \end{bmatrix}, Y = yy^H,$$

$$A_1 = \begin{bmatrix} I_{N_s \times N_t} & 0 \\ 0 & 0 \end{bmatrix}, A_2 = \begin{bmatrix} 0_{N_s \times N_t} & 0 \\ 0 & 1 \end{bmatrix},$$

in which the initial optimization problem of an integrated beamforming matrix is re-represented by formula (XV):

$$\begin{cases} \min_{Y \in H^n} Tr(CY) \\ \text{s.t.} Tr(A_1 Y) = P_T \\ Tr(A_2 Y) = 1 \\ \text{rank}(Y) = 1, Y \geq 0 \end{cases} \quad (XV)$$

4) ignoring non-convex constraint of rank(Y)=1 by a semi-definite relaxation (SDR) method, in which in the formula (XIV), only rank(Y)=1 is non-convex, the problem becomes a semi-definite programming problem and is represented by formula (XVI):

$$\begin{cases} \min_{Y \in H^n} Tr(CY) \\ \text{s.t.} Tr(A_1 Y) = P_T \\ Tr(A_2 Y) = 1 \\ Y \geq 0 \end{cases} \quad (XVI)$$

and
the formula (XVI) is a convex optimization problem, and Y is solved by a CVX toolbox in MATLAB; and 5) solving formula (XVII) and separating y from Y based on the constructed $$y = \begin{bmatrix} f \\ t \end{bmatrix}, Y = yy^H,$$

in the step 2):

$$\min \|Y - yy^H\|_F^2 \quad (XVII),$$

giving a root of a maximum eigenvector multiplied by a maximum eigenvalue of Y equal to an optimal solution y of the formula (XVII), eliminating a last element in the optimal solution y to obtain f=vec(F) in the step 1), and recombining elements in f into a matrix F with a dimension being $N_t \times N_s$ to obtain the integrated beamforming matrix.

The present invention has the following beneficial effects.

In view of the current situation that a beam design with a communication and sensing integration is based on the assumption of far-field targets. The present disclosure provides a beam design method integrated near-field target sensing and far-field communication. In this method, a radar reference beam is constructed with a near-field model, and the weighted minimization problem is solved in emitter power constraint. Compared with the original design, the finally designed beam has better radar near-field focusing capability under the same parameters, the communication rate is not affected, and the communication and sensing performance can be better than that of the original design by modifying the value of the compromise factor.

DETAILED DESCRIPTION OF THE EMBODIMENTS

The present disclosure will be further described with reference to the accompanying drawings and examples, but is not limited thereto.

Embodiment 1

Figure 1:
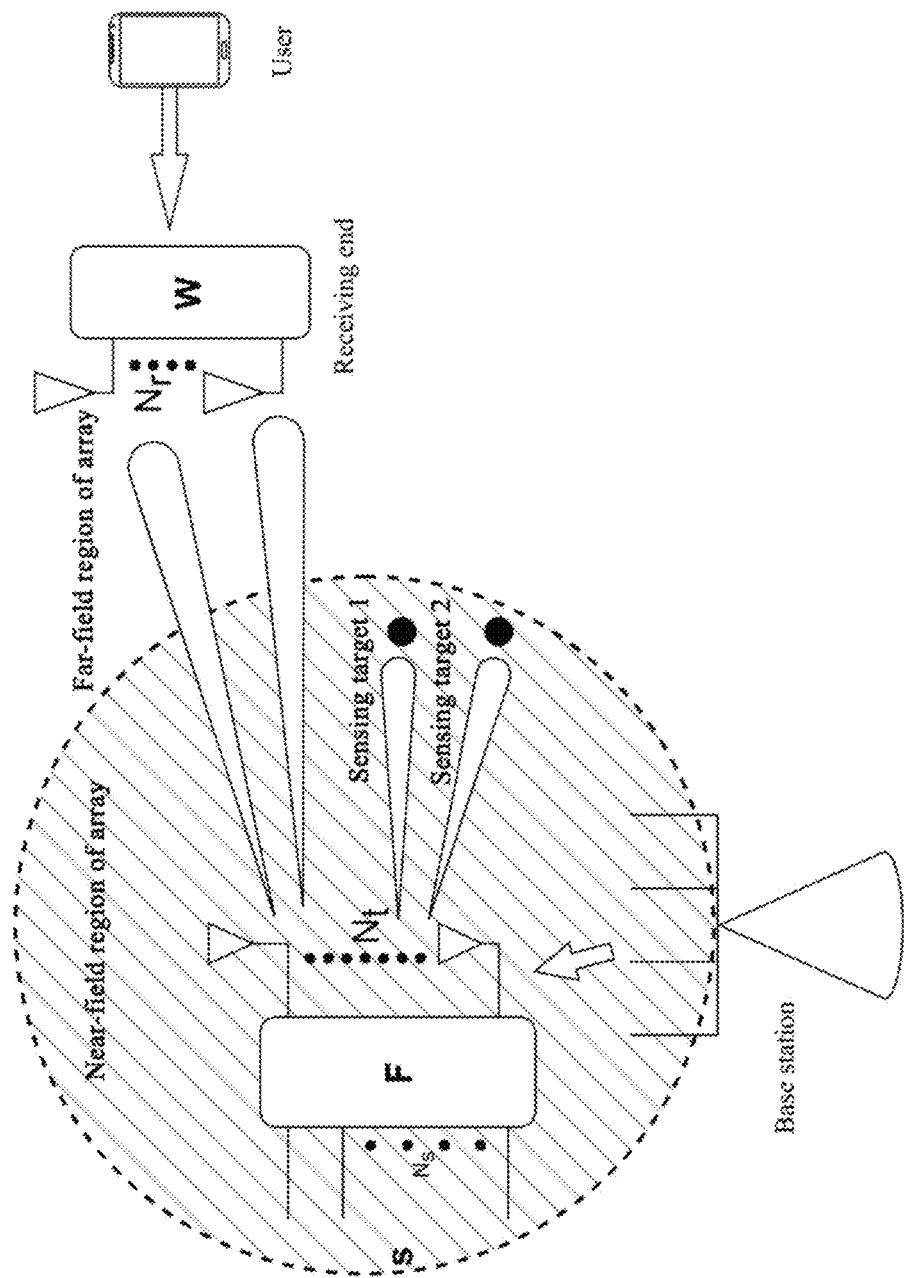
FIG. 1 is a schematic diagram of a multi-antenna integrated system combining near-field sensing and far-field communication used in the present disclosure.

A transmit beamforming method for integrated multi-antenna systems with joint near-field sensing and far-field communication is used in a integrated sensing and communication system with sensing targets in the near-field and communication requirements in the far field. It also conforms to the trend that an array aperture becomes larger. As shown in FIG. 1, the system includes a base station equipped with $N_t$ antennas and a multi-antenna user equipment equipped with $N_r$ antennas. The antennas at the receiving and transmitting ends are uniform linear arrays with antenna array elements spaced half the wavelength. The number of transmit data streams is $N_s$, and the number of targets of interest to a radar is $N_{tar}$. All of them are located in a near-field range of the array, and symbol vectors $s \in \mathbb{C}^{N_s \times 1}$ required to be transmitted by the communication system are unrelated between the data streams and satisfy $\mathbb{E}(ss^H)=I_{N_s}$. The method includes the following steps:

(1) establishing a communication signal transmission model and a communication channel model, and analyzing an upper limit of communication spectrum efficiency;

(2) acquiring an optimal communication beam matrix $F_{com}$ based on the communication channel model in step (1);

(3) establishing a near-field sensing signal model;

(4) generating an optimal radar beam matrix $F_{rad}$ based on an antenna array response vector of a radar detection target;

(5) introducing a compromise factor to construct an initial optimization problem of an integrated beamforming matrix in power constraint based on the established near-field sensing signal model; and (6) transforming and solving the constructed initial optimization problem of an integrated beamforming matrix in step (5) to obtain the integrated beamforming matrix.

Embodiment 2

According to the transmit beamforming method of a multi-antenna integrated system combining near-field sensing and far-field communication in the embodiment 1, it differs as follows.

The establishing a communication signal transmission model in step (1) means that when determining a symbol vector s transmitted by an emitting end, under the action of an transmit beamforming matrix F, the communication signal transmission model is represented by formula (I):

$$Y = \sqrt{\rho} W^H H F s + W^H n \quad (I)$$

In the formula (I), Y represents a signal received by a receiving end; $\rho$ represents average receiving power of the receiving end; $W \in \mathbb{C}^{N_r \times N_s}$ represents a receiving beamforming matrix; $F \in \mathbb{C}^{N_t \times N_s}$ represents the transmit beamforming matrix; $s \in \mathbb{C}^{N_s \times 1}$ represents the symbol vector; various data streams are mutually uncorrelated and satisfy $\mathbb{E}(ss^H)=I_{N_s}$; $H \in \mathbb{C}^{N_r \times N_t}$ represents a transmission channel matrix, namely, the communication channel model; $n \sim \mathbb{N}(0, N_0 I_{N_r})$ represents a Gaussian noise vector; and $N_0$ represents noise power.

For a wireless communication channel, a widely used multi-path channel model, namely, a Saleh-Valenzuela model, is used. If an antenna spacing is half of the wavelength, the transmission channel matrix H is represented by formula (II):

$$H = \sqrt{\frac{N_t \times N_r}{L}} \sum_{i=1}^{L} \alpha_i a_r(\theta_i) a_t^H(\varphi_i). \quad (II)$$

In the formula (II), L represents the number of paths in the channel; $\alpha_i$ represents a fading coefficient of an ith path following Gaussian distribution; $N_t$ represents the number of antennas of an emitting end of a base station; $N_r$ represents the number of antennas received by a user end; $\theta_i$ and $\varphi_i$ represent an arrival angle and an transmit angle of an $i^{th}$ path of beam; and $a_r(\theta_i)$ and $a_t(\varphi_i)$ represent steering vectors of the receiving end and the emitting end of the $i^{th}$ path and are represented by formula (III) and formula (IV), respectively:

$$a_r(\theta_i) = [1, e^{-j\pi \sin(\theta_i)}, \ldots, e^{-j\pi(N-1)\sin(\theta_i)}] \quad (III)$$

$$a_t(\varphi_i) = [1, e^{-j\pi \sin(\varphi_i)}, \ldots, e^{-j\pi(N-1)\sin(\varphi_i)}] \quad (IV).$$

In step (1), the analyzing an upper limit of communication spectrum efficiency means that the root is based on the model represented by the formula (I) [Li X, Alkhateeb A. Deep learning for direct hybrid precoding in millimeter wave massive MIMO systems[C]//2019 53rd Asilomar Conference on Signals, Systems, and Computers. IEEE, 2019: 800-805.], and the upper limit of the communication spectrum efficiency R is represented by formula (V):

$$R = \log_2 |I + R_n^{-1} W^H H F F^H H^H W| \quad (V).$$

In the formula (X), $$R_n = \frac{1}{SNR} W^H W,$$

and SNR represents a signal-to-noise ratio. The upper limit of the communication spectrum efficiency is also used as an index for measuring the communication performance.

In step (2), the optimal communication beam matrix $F_{com}$ is acquired based on the communication channel model in step (1). When the communication channel model is determined, a criterion of maximizing the received SNR ratio is used to acquire the beamforming matrix, and the transmitting beamforming matrix should satisfy:

$$F = \arg\max_F \left[ (HF)^F HF \right].$$

According to the KKT condition in the convex optimization theory, a column of F is composed of eigenvectors corresponding to $N_s$ largest eigenvalues of $H^H H$, where $N_s$ is the number of data streams. Likewise, a column of the receiving beamforming matrix W is composed of eigenvectors corresponding to $N_s$ largest eigenvalues of $HH^H$. The optimal communication beam matrix $F_{com}$ is constructed based on a way of performing singular value decomposition (SVD) on the channel matrix. It specifically refers to:

$H=U\Sigma V^H$ represents singular value decomposition of a transmission channel matrix, and the optimal communication beam matrix $F_{com}$ is composed of right singular vectors of $N_s$ maximum singular values of a right singular matrix obtained after singular value decomposition of H, as shown in formula (VI):

$$F_{com}=V[:,1:N_s] \tag{VI}$$

Similarly, a receiving beamforming matrix W is composed of left singular vectors of the $N_s$ maximum singular values of the right singular matrix obtained after singular value decomposition of H, as shown in formula (VII):

$$W=U[:,1:N_s] \tag{VII}$$

Figure 2:
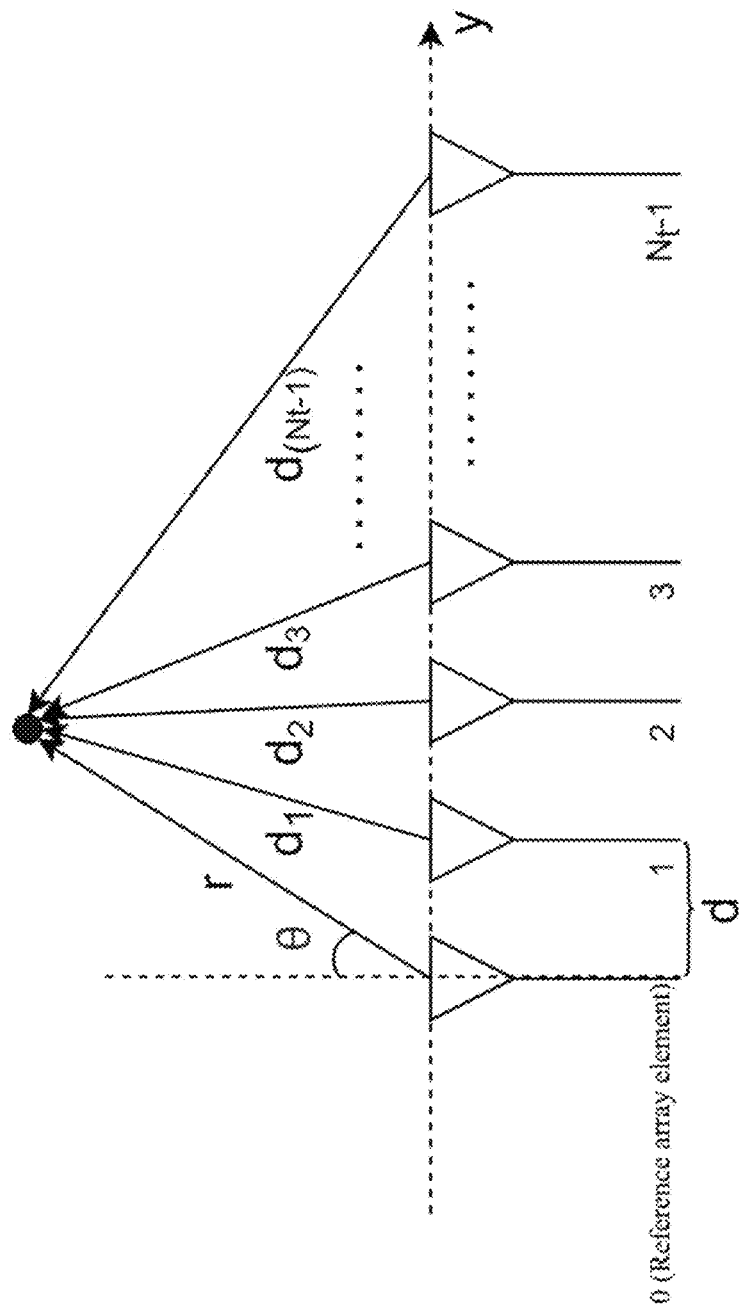
FIG. 2 is a schematic diagram of a near-field transmit signal model.

Step (3) means that based on the near-field spherical wave model of the electromagnetic field signal [Cui M, Dai L. Channel estimation for extremely large-scale MIMO: Far-field or near-field?[J]. IEEE Transactions on Communications, 2022, 70(4): 2663-26771, when the target is located in the near-field range of the array $$r \le \frac{2D^2}{\lambda},$$

as shown in FIG. 2, the array steering vector at the target (r, θ) is established based on the near-field spherical wave model of the electromagnetic field signal, as shown in formula (VIII):

$$a(r,\theta) = \begin{bmatrix} 1 \\ \frac{r}{d_1}\exp(-jk(d_1-r)) \\ \frac{r}{d_2}\exp(-jk(d_2-r)) \\ \vdots \\ \frac{r}{d_{N_t-1}}\exp(-jk(d_{N_t-1}-r)) \end{bmatrix}, r \le \frac{2D^2}{\lambda}. \tag{VIII}$$

In the formula (VII), r represents the distance of the target; θ represents the angle at which the target is located; λ represents the wavelength; D represents an antenna array aperture; $d_i$ represents the distance of the target from an $i^{th}$ antenna array element; $d_i=\sqrt{r^2+y_i^2-2ry_i\sin\theta}$; i=1, 2 ... $N_t$−1; $y_i$=id represents the distance between the $i^{th}$ array element and a reference array element;

$$k = \frac{2\pi}{\lambda}$$

represents a wave number; and $j=\sqrt{-1}$ represents an imaginary symbol.

In step (3), the near-field sensing signal model is represented as a directional pattern of a near-field region radar transmit signal P(θ, r), as shown in formula (IX):

$$P(\theta,r)=a(\theta,r)Ra^H(\theta,r) \tag{IX}$$

In the formula (IX), R represents a covariance matrix of the transmit signal.

In step (4), the generating an optimal radar beam matrix $F_{rad}$ based on an antenna array response vector of a radar detection target specifically includes:

1) determining a radar signal design method, in which the document [Li J, Stoica P. MIMO radar with colocated antennas[J]. IEEE Signal Processing Magazine, 2007, 24(5): 106-114.] has proved that designing a radar detection signal x is equivalent to designing its covariance matrix: $R=\mathbb{E}(xx^H)=\mathbb{E}(Fs(Fs)^H)=FF^H$, it is clear that the design of the radar detection signal x in the present disclosure is equivalent to the design of the transmit beamforming matrix F, and the formula (IX) is represented by formula (X):

$$P(\theta,r)=a_t^H(\theta,r)Ra_t(\theta,r)=\|F^Ha_t(\theta,r)\|_F^2 \tag{X}$$

where $\|\cdot\|_F$ represents the Frobenius norm; and 2) generating the optimal radar beam matrix $F_{rad}$ directly based on the antenna array response vector of the radar detection target, in which an transmit front end is a hybrid modulus fully-connected structure, the hybrid modulus fully-connected structure, i.e., each RF link is connected to all emitting antennas by $N_t$ phase shifters, and the optimal radar beam matrix $F_{rad}$ is constructed as formula (XI):

$$F_{rad}=[v_1\ v_2\ \ldots\ v_{tar}] \in \mathbb{C}^{N_t \times N_{tar}} \tag{XI}$$

In the formula (XI), $v_i$ is an element in an array steering vector:

$$v_i = \frac{1}{\sqrt{N_t}}a(\theta_i, r_i)\ i=1, 2 \ldots N_{tar}; N_{tar}$$

is the number of the detection targets; $a(\theta_i,r_i)$ represents a steering vector at which an $i^{th}$ detection target is located; and $\theta_i$ and $r_i$ represent the angle and the distance of the $i^{th}$ target.

A radar performance measurement index is defined as a Euclidean distance between the transmit beamforming matrix F and the optimal radar beam matrix $F_{rad}$: $\|F-F_{rad}\|_F^2$.

In step (5), introducing a compromise factor to construct an initial optimization problem of an integrated beamforming matrix in power constraint based on the established near-field sensing signal model. It means that transmit power is taken as constraint, the target function is to minimize a sum of Euclidean distances between an transmit beamforming matrix F, the optimal radar beam matrix $F_{rad}$ and the optimal communication beam matrix $F_{com}$ with the compromise factor being introduced, and the optimization problem, namely, the initial optimization problem of an integrated beamforming matrix is established and represented by formula (XII):

$$\begin{cases} \min \eta\|F-F_{com}\|_F^2 + (1+\eta)\|F-F_{rad}\|_F^2 \\ \text{s.t.}\|F\|_F^2 = P_T \end{cases} \tag{XII}$$

In the formula (XII), $F_{com}$ represents the optimal (reference) beam matrix for communication; $F_{rad}$ represents the optimal (reference) beam matrix of a radar; η represents the compromise factor within [0, 1]; and $P_T$ represents total transmit power. The beam matrix should approximate the reference beam as much as possible to ensure the performance of communication and a radar. The compromise factor η is used to adjust the weight of the performance of communication or the radar. The larger the value is, the better the beam communication performance is.

In step (6), transforming and solving the constructed initial optimization problem of an integrated beamforming matrix in step (5) to obtain the integrated beamforming matrix specifically includes:

1) constructing auxiliary variables $A=[\sqrt{\eta}I_{N_t}^T, \sqrt{1-\eta}I_{N_t}^T]^T \in \mathbb{C}^{2N_t \times N_t}$ and $B=[\sqrt{\eta}F_{com}^T, \sqrt{1-\eta}F_{rad}^T]^T \in \mathbb{C}^{2N_t \times N_s}$, and converting formula (XI) into a quadratic constrained and quadratic programming problem in an equivalent form, as shown in formula (XIII):

$$\begin{cases} \min_F \|AF - B\|_F^2 \\ \text{s.t.} \|F\|_F^2 = P_T \end{cases} \quad \text{(XIII)}$$

2) introducing $E=I_{N_s} \otimes A$, $f=\text{vec}(F)$, $b=\text{vec}(B)$, $t=\pm 1$, in which vec ($\square$) represents an column vector stacking operation, $\otimes$ represents a Kronecker product, and the formula (XIII) is deformed to obtain formula (XIV):

$$\begin{cases} \min_f \|Ef - tb\|_2^2 \\ \text{s.t.} \|f\|_2^2 = P_T, t^2 = 1 \end{cases} \quad \text{(XIV)}$$

and further decomposed into:

$$\|Ef - tb\|_2^2 = (Ef - tb)^H$$

$$(Ef - tb) = \begin{bmatrix} f^H & t \end{bmatrix} \begin{bmatrix} E^H \\ -b^H \end{bmatrix} \begin{bmatrix} E & -b \end{bmatrix} \begin{bmatrix} f \\ t \end{bmatrix} = \begin{bmatrix} f^H & t \end{bmatrix} \begin{bmatrix} E^H E & -b^H E^H \\ -b^H b & b^H b \end{bmatrix} \begin{bmatrix} f \\ t \end{bmatrix},$$

$$\|f\|_2^2 = \begin{bmatrix} f^H & t \end{bmatrix} \begin{bmatrix} I_{N_tN_s} & 0 \\ 0 & 0 \end{bmatrix} \begin{bmatrix} f \\ t \end{bmatrix},$$

$$\|t\|_2^2 = \begin{bmatrix} f^H & t \end{bmatrix} \begin{bmatrix} 0_{N_tN_s} & 0 \\ 0 & 1 \end{bmatrix} \begin{bmatrix} f \\ t \end{bmatrix},$$

3) constructing $$C = \begin{bmatrix} E^H E & -E^H b \\ -b^H E & b^H b \end{bmatrix}, y = \begin{bmatrix} f \\ t \end{bmatrix}, Y = yy^H,$$

$$A_1 = \begin{bmatrix} I_{N_s \times N_t} & 0 \\ 0 & 0 \end{bmatrix}, A_2 = \begin{bmatrix} 0_{N_s \times N_t} & 0 \\ 0 & 1 \end{bmatrix},$$

in which the initial optimization problem of an integrated beamforming matrix is re-represented by formula (XV):

$$\begin{cases} \min_{Y \in H^n} Tr(CY) \\ \text{s.t.} Tr(A_1 Y) = P_T \\ Tr(A_2 Y) = 1 \\ \text{rank}(Y) = 1, Y \geq 0 \end{cases} \quad \text{(XV)}$$

4) ignoring non-convex constraint of rank(Y)=1 by a semi-definite relaxation (SDR) method, in which in the formula (XV), only rank(Y)=1 is non-convex, the problem becomes a semi-definite programming problem and is represented by formula (XVI):

$$\begin{cases} \min_{Y \in H^n} Tr(CY) \\ \text{s.t.} Tr(A_1 Y) = P_T \\ Tr(A_2 Y) = 1 \\ Y \geq 0 \end{cases} \quad \text{(XVI)}$$

and the formula (XVI) is a convex optimization problem, and Y is solved by a CVX toolbox in MATLAB; and 5) solving formula (XVII) and separating y from Y based on the constructed $$y = \begin{bmatrix} f \\ t \end{bmatrix}, Y = yy^H,$$

in the step 2):

$$\min \|Y - yy^H\|_F^2 \quad \text{(XVII)},$$

giving a root of a maximum eigenvector multiplied by a maximum eigenvalue of Y equal to an optimal solution y of the formula (XVII), eliminating a last element in the optimal solution y to obtain f=vec(F) in the step 1), and recombining elements in f into a matrix F with a dimension being $N_t \times N_s$ to obtain the integrated beamforming matrix.

In the present embodiment, the number of antennas of the emitting end $N_t$=128, the number of antennas received by the user $N_r$=2, a data flow to be transmitted $N_s$=2, a carrier wavelength $\lambda$=10 mm, and the number of targets of interest $N_{tar}$=2 are set to be located in (−40°, 200$\lambda$) and (20°, 500$\lambda$). The channel matrix H is a complex Gaussian matrix that is statistically independent and identically distributed, elements thereof are random variables of a complex Gaussian distribution following the zero mean value and unit variance, and the number of scattering paths in the channel is L=4.

Figure 3:
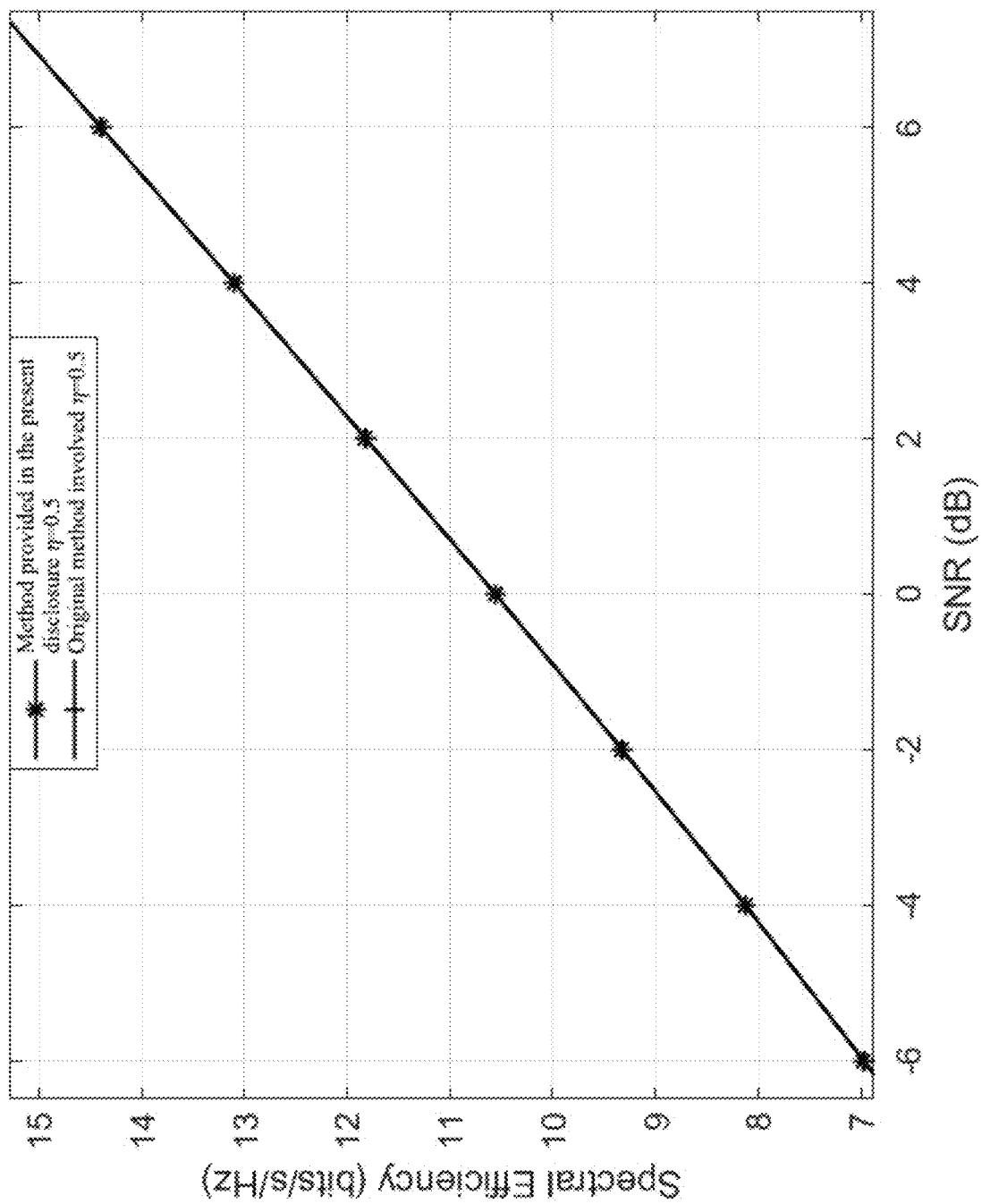
FIG. 3 is a diagram comparing spectral efficiency of beam communication of the original design with that of the present disclosure.

The communication performance of the integrated beam designed in the present disclosure is analyzed from the spectral efficiency. FIG. 3 is a diagram comparing spectral efficiency of beam communication of the original design with that of the present disclosure. All the compromise factors $\eta$ are 0.5, the horizontal coordinate is the signal-to-noise ratio (SNR) in dB, and the longitudinal coordinate is the spectral efficiency in bit/s/Hz, which is defined as the net bit rate (useful information rate, excluding error correcting codes) or the maximum throughput divided by the bandwidth of the communication channel or data link (unit: hertz). It can be seen from FIG. 3 that the spectral efficiency of the beam communication of the two design is almost the same, i.e., the design of the present disclosure guarantees the original communication performance.

Figure 4:
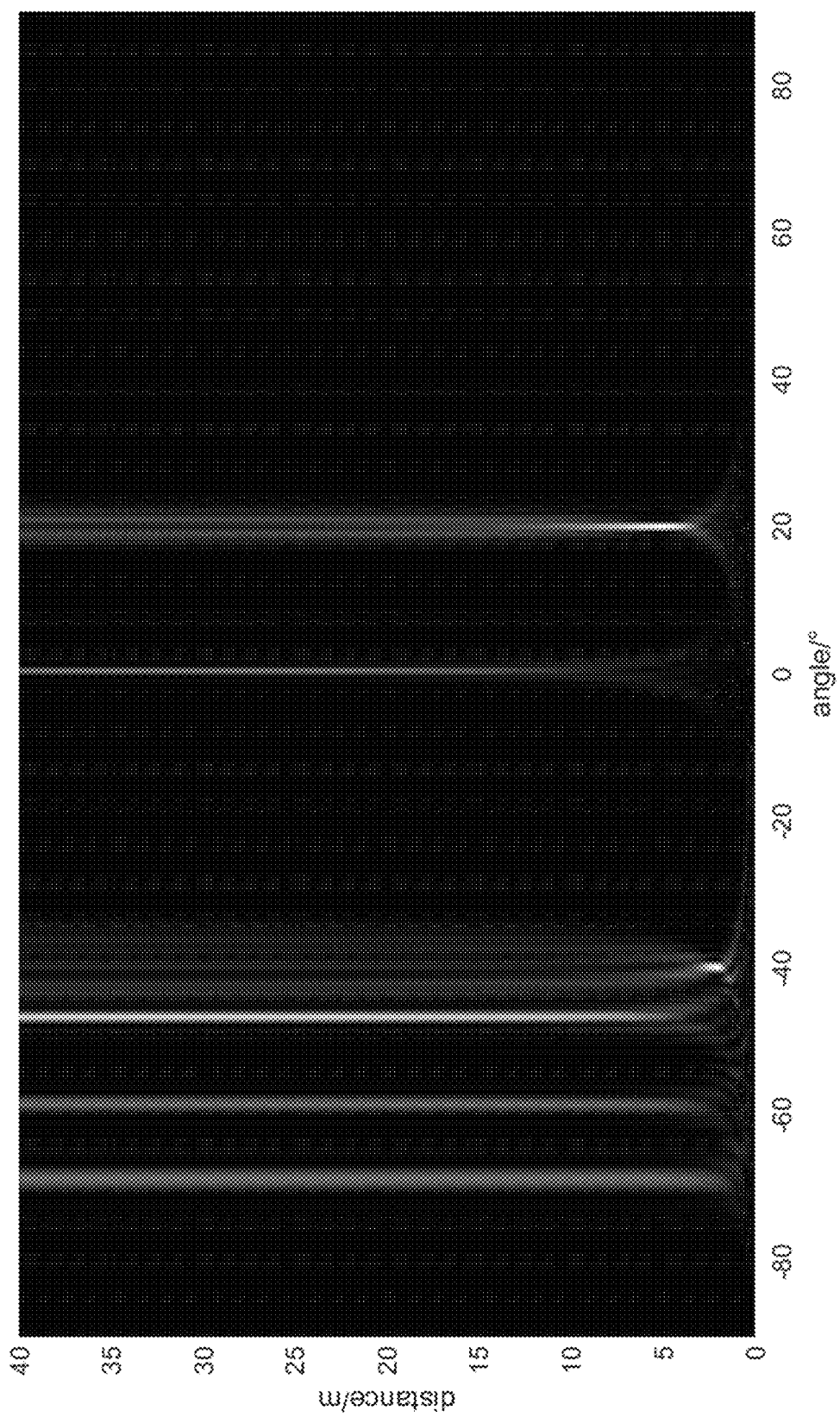
FIG. 4 is a density diagram showing transmit power (normalized) of an integrated beam combining near-field sensing and far-field communication of the present disclosure.
Figure 5:
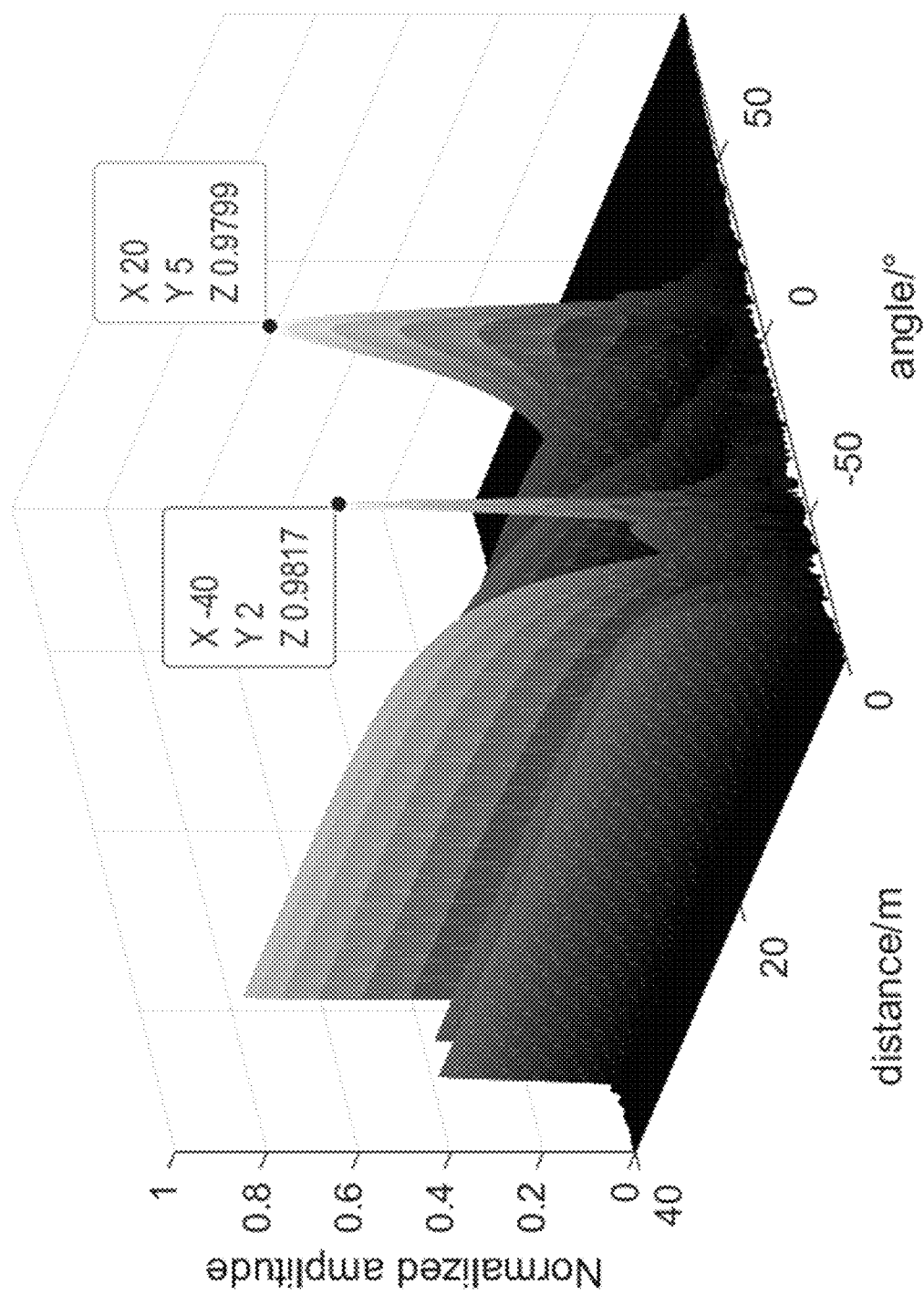
FIG. 5 is a three-dimensional schematic diagram showing transmit power (normalized) of an integrated beam combining near-field sensing and far-field communication of the present disclosure.
Figure 6:
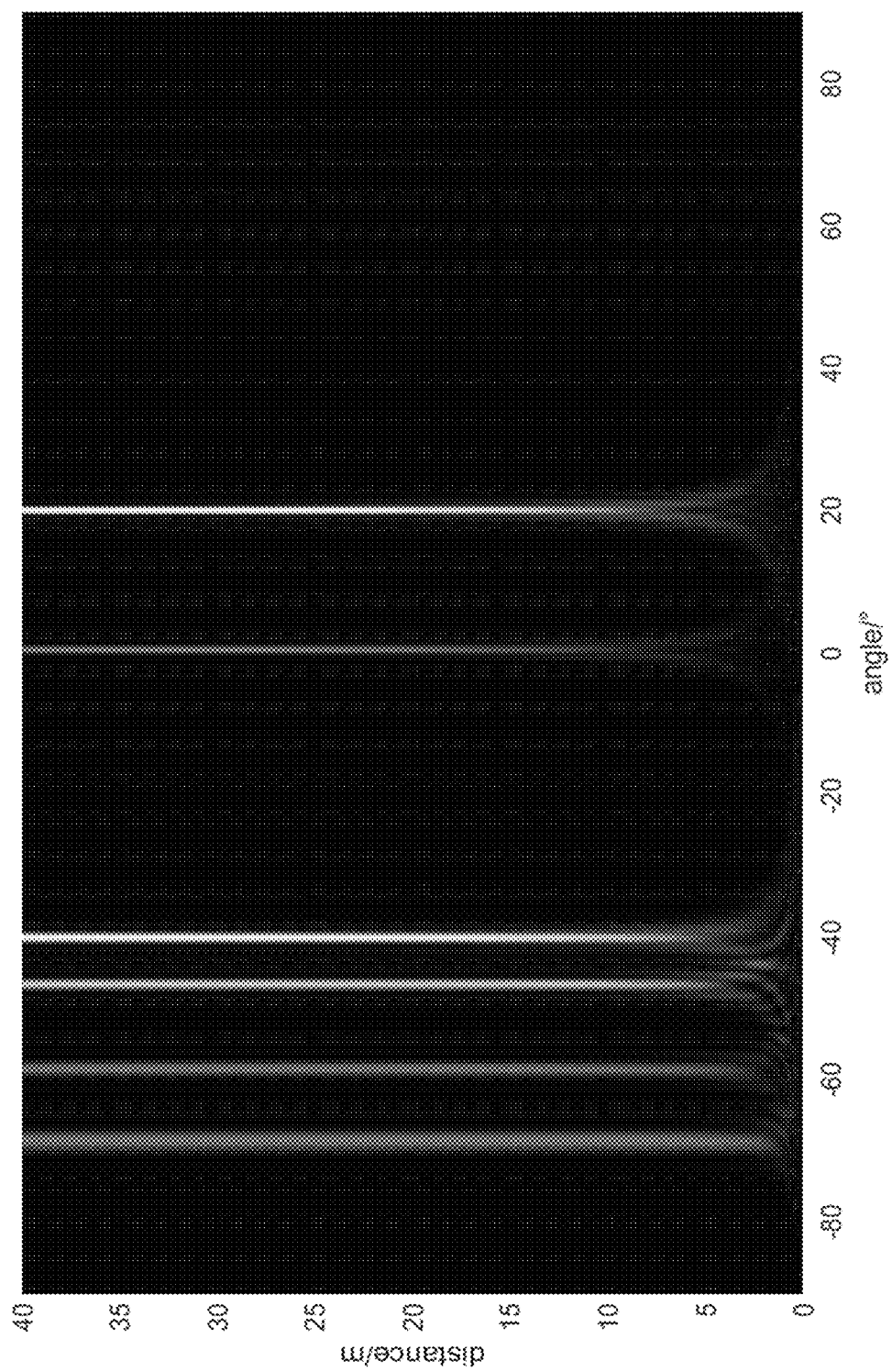
FIG. 6 is a density diagram showing transmit power (normalized) of an integrated beam of the original design.
Figure 7:
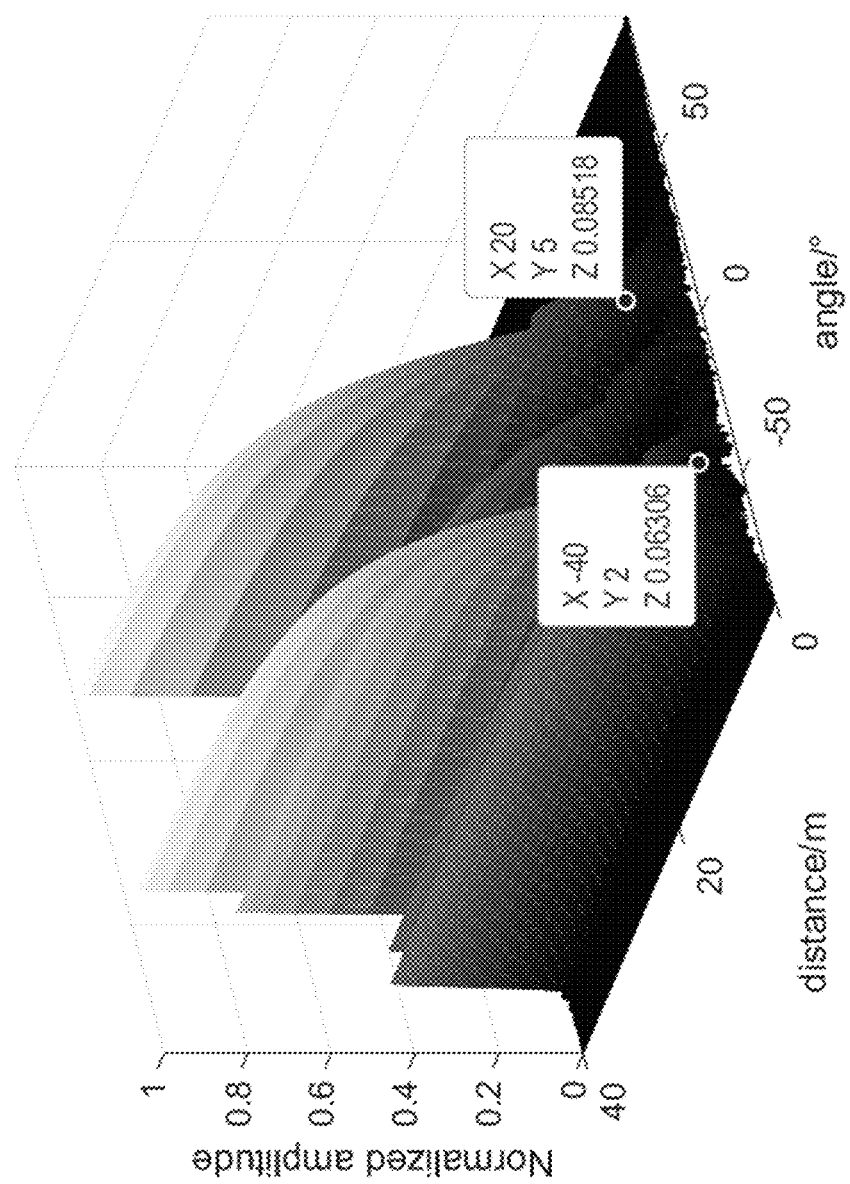
FIG. 7 is a three-dimensional schematic diagram showing transmit power (normalized) of an integrated beam of the original design.

FIG. 4 and FIG. 5 are a density diagram and a three-dimensional schematic diagram showing transmit power (normalized) of an integrated beam combining near-field sensing and far-field communication of the present disclosure, respectively. FIG. 6 and FIG. 7 are a density diagram and a three-dimensional schematic diagram showing transmit power (normalized) of an integrated beam of the original design, respectively. They show the power distribution of the emitting antennas. It is found by comparison that the beam designed by the present disclosure has a good focusing effect at a target point of interest, and the near-field focusing effect is more obvious as the target distance is closer. $\|F-F_{rad}\|_F^2$ is checked to determine whether the beam pattern is close to the reference beam pattern. The difference value between the beam designed in the present disclosure and the reference beam is 1.1732, and the difference value between the originally designed beam and the reference beam is 3.6696. Combined with the comparison of the communication performance, by modifying the value of the compromise factor appropriately, the integrated beam in this scenario is superior to the original beam design scheme in both communication and sensing performance.

What is claimed is:

1. An emission beamforming method of a multi-antenna integrated system combining near-field sensing and far-field communication, comprising a computer readable medium operable on a computer with memory for the emission beamforming method of a multi-antenna integrated system combining near-field sensing and far-field communication, and comprising program instructions for executing the following steps:

(i) establishing a communication signal transmission model and a communication channel model, and analyzing an upper limit of communication spectrum efficiency;

(ii) acquiring an optimal communication beam matrix $F_{com}$ based on the communication channel model in step (i);

(iii) establishing a sensing near-field region signal model;

(iv) generating an optimal radar beam matrix $F_{rad}$ based on an antenna array response vector of a radar detection target;

(v) introducing a compromise factor to construct an initial optimization problem of an integrated beamforming matrix in power constraint based on the established sensing near-field region signal model;

(vi) transforming and solving the constructed initial optimization problem of an integrated beamforming matrix in step (v) to obtain the integrated beamforming matrix; and (vii) improving performance for the near-field sensing and increasing capability of the far-field communication based on the integrated beamforming matrix;

wherein in step (iii), the sensing near-field region signal model is represented as a directional pattern of a near-field region radar emission signal $P(\theta, r)$, as shown in formula (IX):

$$P(\theta,r)=a(\theta,r)Ra^H(\theta,r) \quad \text{(IX)};$$

in the formula (IX), R represents a covariance matrix of the emission signal;

in step (iv), the generating an optimal radar beam matrix $F_{rad}$ based on an antenna array response vector of a radar detection target specifically comprises:

a) making a design of a radar detection signal x equivalent to a design of an emission beamforming matrix F, wherein due to a covariance matrix of the emission signal $R=E(xx^H)=E(Fs(Fs)^H)=FF^H$, formula (IX) is represented by formula (X):

$$P(\theta,r)=a_t^H(\theta,r)Ra_t(\theta,r)=\|F^H a_t(\theta,r)\|_F^2 \quad \text{(X), and}$$

b) generating the optimal radar beam matrix $F_{rad}$ directly based on the antenna array response vector of the radar detection target, wherein an emission front end is a hybrid modulus fully-connected structure, the optimal radar beam matrix $F_{rad}$ is constructed as formula (XI):

$$F_{rad}=[v_1 \; v_2 \ldots v_{tar}] \in \mathbb{C}^{N_t \times N_{tar}} \quad \text{(XI)};$$

in the formula (XI), $v_i$ is an element in an array steering vector:

$$v_i = \frac{1}{\sqrt{N_t}} a(\theta_i, r_i) i = 1, 2 \ldots N_{tar}, N_{tar}$$

is the number of the detection targets, $a(\theta_i,r_i)$ represents a steering vector at which an $i^{th}$ detection target is located, and $\theta_i$ and $r_i$ represent an angle and a distance of the $i^{th}$ target;

a radar performance measurement index is defined as an Euclidean distance between the emission beamforming matrix F and the optimal radar beam matrix $F_{rad}$: $\|F-F_{rad}\|_F^2$;

in step (v), the introducing a compromise factor to construct an initial optimization problem of an integrated beamforming matrix in power constraint based on the established sensing near-field region signal model means that emission power is taken as constraint, an target function is to minimize a sum of Euclidean distances between an emission beamforming matrix F, the optimal radar beam matrix $F_{rad}$ and the optimal communication beam matrix $F_{com}$ with the compromise factor being introduced, and the optimization problem, namely, the initial optimization problem of an integrated beamforming matrix is established and represented by formula (XII):

$$\begin{cases} \min_F \eta\|F - F_{com}\|_F^2 + (1-\eta)\|F - F_{rad}\|_F^2 \\ \text{s.t. } \|F\|_F^2 = P_T \end{cases} \quad \text{(XII)}$$

in the formula (XII), $F_{com}$ represents the optimal beam matrix for communication, $F_{rad}$ represents the optimal beam matrix of an radar, $\eta$ represents the compromise factor within [0, 1], and $P_T$ represents total emission power; and in step (vi), the transforming and solving the constructed initial optimization problem of an integrated beamforming matrix in step (5) to obtain the integrated beamforming matrix specifically comprises:

a) constructing auxiliary variables $A=[\sqrt{\eta}I_{N_s}^T, \sqrt{1-\eta}I_{N_s}^T]^T \in \mathbb{C}^{2N_t \times N_t}$ and $B=[\sqrt{\eta}F_{com}^T, \sqrt{1-\eta}F_{rad}^T]^T \in \mathbb{C}^{2N_t \times N_s}$, and converting formula (XI) into a quadratic constrained and quadratic programming problem in an equivalent form, as shown in formula (XIII):

$$\begin{cases} \min_F \|AF - B\|_F^2 \\ \text{s.t. } \|F\|_F^2 = P_T \end{cases} \quad \text{(XIII)}$$

b) introducing $E=I_{N_s} \otimes A$, $f=\text{vec}(F)$, $b=\text{vec}(B)$, $t=\pm 1$, in which vec ($\square$) represents an column vector stacking operation, $\otimes$ represents a Kronecker product, and the formula (XIII) is deformed to obtain formula (XIV):

$$\begin{cases} \min_f \|Ef - tb\|_2^2 \\ \text{s.t. } \|f\|_2^2 = P_T, t^2 = 1 \end{cases} \quad \text{(XIV)}$$

c) constructing $$C = \begin{bmatrix} E^H E & -E^H b \\ -b^H E & b^H b \end{bmatrix}, y = \begin{bmatrix} f \\ t \end{bmatrix}, Y = yy^H,$$

$$A_1 = \begin{bmatrix} I_{N_s \times N_t} & 0 \\ 0 & 0 \end{bmatrix}, A_2 = \begin{bmatrix} 0_{N_s \times N_t} & 0 \\ 0 & 1 \end{bmatrix},$$

wherein the initial optimization problem of an integrated beamforming matrix is re-represented by formula (XV):

$$\begin{cases} \min_{Y \in H^n} Tr(CY) \\ \text{s.t. } Tr(A_1 Y) = P_T \\ Tr(A_2 Y) = 1 \\ \text{rank}(Y) = 1, Y \geq 0 \end{cases} \quad \text{(XV)}$$

d) ignoring non-convex constraint of rank(Y)=1 by a semi-definite relaxation method, wherein in the formula (XV), only rank(Y)=1 is non-convex, the problem becomes a semi-definite programming problem and is represented by formula (XVI):

$$\begin{cases} \min_{Y \in H^n} Tr(CY) \\ \text{s.t. } Tr(A_1 Y) = P_T \\ Tr(A_2 Y) = 1 \\ Y \geq 0 \end{cases} \quad \text{(XVI)}$$

and
the formula (XVI) is a convex optimization problem, and Y is solved by a CVX toolbox in MATLAB, and
e) solving formula (XVII) and separating y from Y based on the constructed $$y = \begin{bmatrix} f \\ t \end{bmatrix}, Y = yy^H,$$

in the step b):

$$\min \|Y - yy^H\|_F^2 \quad \text{(XVII)}$$

giving a root of a maximum eigenvector multiplied by a maximum eigenvalue of Y equal to an optimal solution y of the formula (XVII), eliminating a last element in the optimal solution y to obtain f=vec(F) in the step a), and recombining elements in f into a matrix F with a dimension being $N_t \times N_s$ to obtain the integrated beamforming matrix.

2. The method according to claim 1, wherein the method is applied to a multi-input and multi-output communication and sense integration system; the system comprises a base station equipped with $N_t$ antennas and multi-antenna user equipment equipped with $N_r$ antennas; antennas of a receiving end and an emitting end use a uniform linear array, and an antenna array element spacing is half of a wavelength; and the number of emitted data flows is $N_s$, and the number of targets of interest to a radar is $N_{tar}$.

3. The method according to claim 1, wherein the establishing a communication signal transmission model in step (i) means that when determining a symbol vector s transmitted by an emitting end, under the action of an emission beamforming matrix F, the communication signal transmission model is represented by formula (I):

$$Y = \sqrt{\rho} W^H H F s + W^H n \quad \text{(I); and}$$

in the formula (I), Y represents a signal received by a receiving end, ρ represents average receiving power of the receiving end, $W \in \mathbb{C}^{N_r \times N_s}$ represents a receiving beamforming matrix, $F \in \mathbb{C}^{N_t \times N_s}$ represents the emission beamforming matrix, $s \in \mathbb{C}^{N_s \times 1}$ represents the symbol vector, various data flows are mutually uncorrelated and satisfy $\mathbb{E}(ss^H) = I_{N_s}$, and $H \in \mathbb{C}^{N_r \times N_t}$ represents a transmission channel matrix, namely, the communication channel model, $n \sim \mathbb{N}(0, N_0 I_{M_r})$ represents a Gaussian noise vector, and $N_0$ represents noise power.

4. The method according to claim 3, wherein for a wireless communication channel, a multi-path channel model, namely, a Saleh-Valenzuela model, is used, and if an antenna spacing is half of a wavelength, the transmission channel matrix H is represented by formula (II):

$$H = \sqrt{\frac{N_t \times N_r}{L}} \sum_{i=1}^{L} \alpha_i a_r(\theta_i) a_t^H(\varphi_i); \quad \text{(II)}$$

and in formula (II), L represents the number of paths in the channel, $\alpha_i$ represents a fading coefficient of an $i^{th}$ path following Gaussian distribution, $N_t$ represents the number of antennas of an emitting end of a base station, $N_r$ represents the number of antennas received by a user end, $\theta_i$ and $\varphi_i$ represent an arrival angle and an emission angle of an $i^{th}$ path of beam, and $a_r(\theta_i)$ and $a_t(\varphi_i)$ represent steering vectors of the receiving end and the emitting end of the $i^{th}$ path and are represented by formula (III) and formula (IV), respectively:

$$a_r(\theta_i) = [1, e^{-j\pi \sin(\theta_i)}, \ldots, e^{-j\pi(N-1)\sin(\theta_i)}] \quad \text{(III)}$$

$$a_t(\varphi_i) = [1, e^{-j\pi \sin(\varphi_i)}, \ldots, e^{-j\pi(N-1)\sin(\varphi_i)}] \quad \text{(IV)}.$$

5. The method according to claim 1, wherein in step (i), the analyzing an upper limit of communication spectrum efficiency means that the upper limit of the communication spectrum efficiency R is represented by formula (V):

$$R = \log_2 |I + R_n^{-1} W^H H F F^H H^H W| \quad \text{(V); and}$$

in the formula $$R_n = \frac{1}{SNR} W^H W, \quad \text{(V)}$$

and SNR represents a signal noise ratio.

6. The method according to claim 1, wherein in step (ii), the acquiring an optimal communication beam matrix $F_{com}$ based on the communication channel model in step (1) means that the optimal communication beam matrix $F_{com}$ is constructed based on a way of singular value decomposition of a channel matrix, and specifically means that $H = U\Sigma V^H$ represents singular value decomposition of a transmission channel matrix, and the optimal communication beam matrix $F_{com}$ is composed of right singular vectors of $N_s$ maximum singular values of a right singular matrix obtained after singular value decomposition of H, as shown in formula (VI):

$$F_{com} = V[:,1:N_s] \qquad (VI);$$

and a receiving beamforming matrix W is composed of left singular vectors of the $N_s$ maximum singular values of the right singular matrix obtained after singular value decomposition of H, as shown in formula (VII):

$$W = U[:,1:N_s] \qquad (VII).$$

7. The method according to claim 1, wherein step (iii) means that when the target is in an array near-field range $$r \leq \frac{2D^2}{\lambda},$$

an array steering vector at the target (r, θ) is established, as shown in formula (VIII):

$$a(r, \theta) = \begin{bmatrix} 1 \\ \frac{r}{d_1}\exp(-jk(d_1 - r)) \\ \frac{r}{d_2}\exp(-jk(d_2 - r)) \\ \vdots \\ \frac{r}{d_{N_t-1}}\exp(-jk(d_{N_t-1} - r)) \end{bmatrix}, r \leq \frac{2D^2}{\lambda}; \qquad (VIII)$$

and in the formula (VIII), r represents a distance of the target, θ represents an angle at which the target is located, λ represents a wavelength, D represents an antenna array aperture, $d_i$ represents a distance of the target from an $i^{th}$ antenna array element, $$i = 1, 2 \ldots N_t - 1, k = \frac{2\pi}{\lambda}$$

represents a wave number, and $j = \sqrt{-1}$ represents an imaginary symbol.

* * * * *